United States Patent
Masters

(10) Patent No.: US 12,410,941 B2
(45) Date of Patent: Sep. 9, 2025

(54) VENT SEAL ASSEMBLY

(71) Applicant: Aaron C Masters, Dallas, TX (US)

(72) Inventor: Aaron C Masters, Dallas, TX (US)

( * ) Notice: Subject to any disclaimer, the term of this patent is extended or adjusted under 35 U.S.C. 154(b) by 370 days.

(21) Appl. No.: 17/752,092

(22) Filed: May 24, 2022

(65) Prior Publication Data

US 2023/0383992 A1 Nov. 30, 2023

(51) Int. Cl.
*B01D 46/00* (2022.01)
*F24F 13/28* (2006.01)
*F16J 15/10* (2006.01)

(52) U.S. Cl.
CPC .......... *F24F 13/28* (2013.01); *B01D 46/0002* (2013.01); *B01D 2271/02* (2013.01); *F16J 15/104* (2013.01)

(58) Field of Classification Search
CPC . F24F 13/28; B01D 46/0002; B01D 2271/02; B01D 2271/022; B01D 2279/35; B01D 46/10; F16J 15/104; F16J 15/027; F16J 15/061
See application file for complete search history.

(56) References Cited

U.S. PATENT DOCUMENTS

| | | | | |
|---|---|---|---|---|
| 11,358,088 | B1 * | 6/2022 | Englmaier | B01D 46/0004 |
| 2012/0060455 | A1 * | 3/2012 | Lange | B01D 46/0005 55/497 |
| 2021/0032796 | A1 * | 2/2021 | Nam | D06F 58/22 |
| 2021/0396427 | A1 * | 12/2021 | Gorman | B01D 46/001 |
| 2023/0356130 | A1 * | 11/2023 | Proost | B01D 46/0005 |
| 2024/0198265 | A1 * | 6/2024 | Verstraete | B01D 46/0005 |

* cited by examiner

*Primary Examiner* — Dung H Bui
(74) *Attorney, Agent, or Firm* — Law Office of Jeff Williams PLLC; J. Oliver Williams

(57) ABSTRACT

A return air seal assembly includes a flexible body that is formed from one or more members that includes a compression member coupled to a first arm at a first edge and a second arm coupled to the first arm at a distal end opposite the first edge. The flexible return air seal is configured to wrap around a return vent assembly opening so as to locate a seal between the air filter and the frame. The compression member flexes to create a seal with the filter to eliminate the passage of air around the filter. The seal assembly wraps around multiple surfaces of an angled filter arm of the frame.

9 Claims, 5 Drawing Sheets

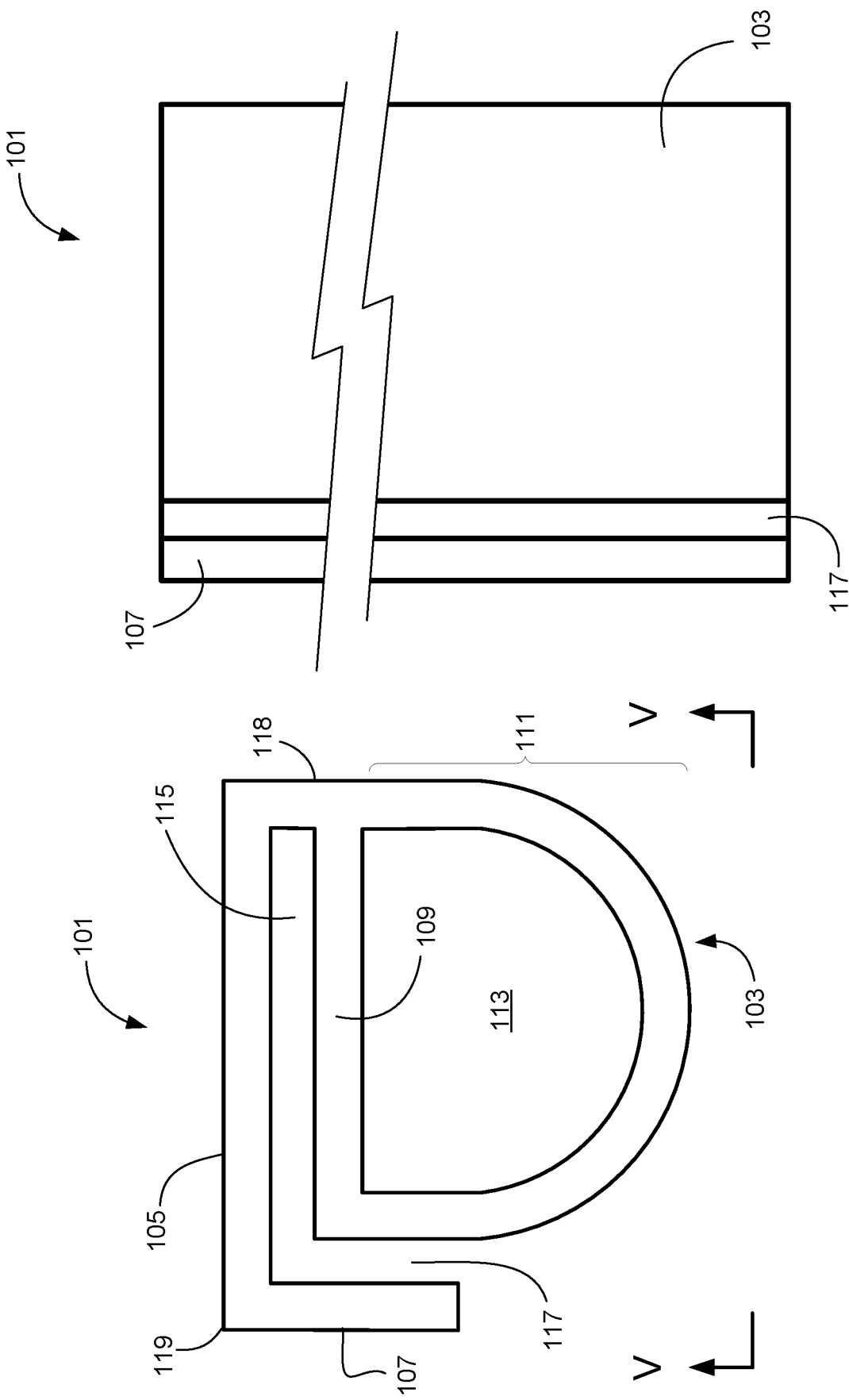

VENT SEAL ASSEMBLY

BACKGROUND OF THE INVENTION

1. Field of the Invention

The present application relates to a return air filter grille, and more particularly to a universal seal for a return air filter grille.

2. Description of Related Art

The need for ventilation in a building is known. Air ducts are used in forced air systems designed to transport air from one place to another. Air is forced out into spaces via an air vent and returned to the system through a return vent. As seen in FIG. 1, a return vent assembly 51 is shown. It has a frame assembly 53 and a grille 55. The grille 55 covers the opening of the frame assembly 53. Grille 55 is configured to open/pivot relative to frame assembly 53 to allow for insertion and removal of a filter 57.

As seen in FIG. 3, grille 55 is removed to show filter 57. Filter 57 is configured to nestle into frame assembly 53 and is held in place by grille 55. Filter 57 usually is not sealed against frame assembly 53. Filter 57 is raised into a recessed opening of frame assembly 53 but is not tightly compressed against the frame assembly 53. Assembly 53 has a first ledge 59 and a rim 61. Grille 55 seats against ledge 59 within rim 61.

Although strides have been made, shortcomings remain. In forced air systems, air is sucked back through assembly 51. Gaps exist between filter 57 and assembly 53. This causes air to pass around the filter 57 as the filter clogs. The air is then unfiltered. It is desired that a seal be provided that restricts the passage of air around the filter to enable all air to be fully filtered through filter 57.

BRIEF SUMMARY OF THE INVENTION

It is an object of the present application to provide a return air seal assembly comprising one or more seals that are configured to fit on, and around, existing vent frame assemblies. It is desired that the seal be configured to contact the frame assembly on multiple surfaces. It is an object of the present return air seal assembly to provide a compressive force on a filter within the frame assembly to secure the filter in the frame opening. Additionally, the return air seal assembly is configured to attach to the downstream side of the filter frame assembly.

Ultimately the invention may take many embodiments. In these ways, the present invention overcomes the disadvantages inherent in the prior art. The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 4 is a side section view of a return air seal for use in a return vent assembly of FIG. 1, according to an embodiment of the present application.

FIG. 5 is a front view of the return air seal assembly of FIG. 4.

Figure 1:
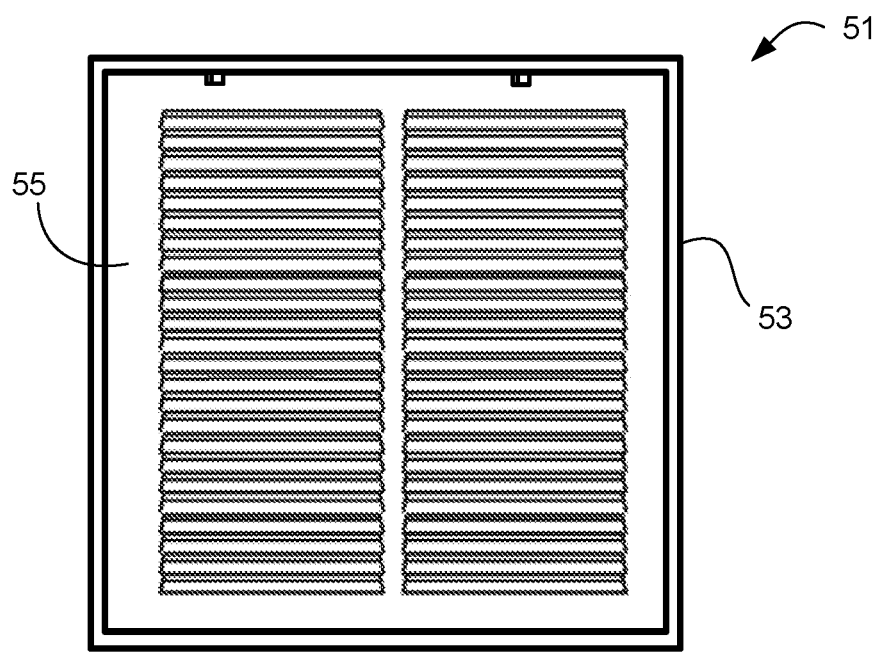
FIG. 1 is a front view of a return vent assembly.
Figure 2:
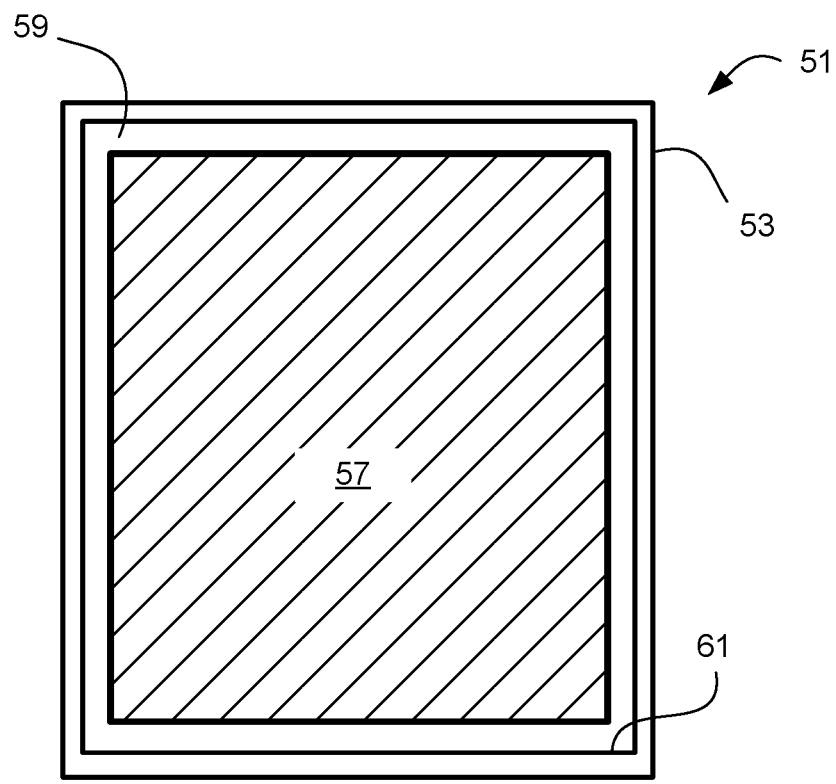
FIG. 2 is a front view of the return vent assembly of FIG. 1 with a grille removed.
Figure 3:
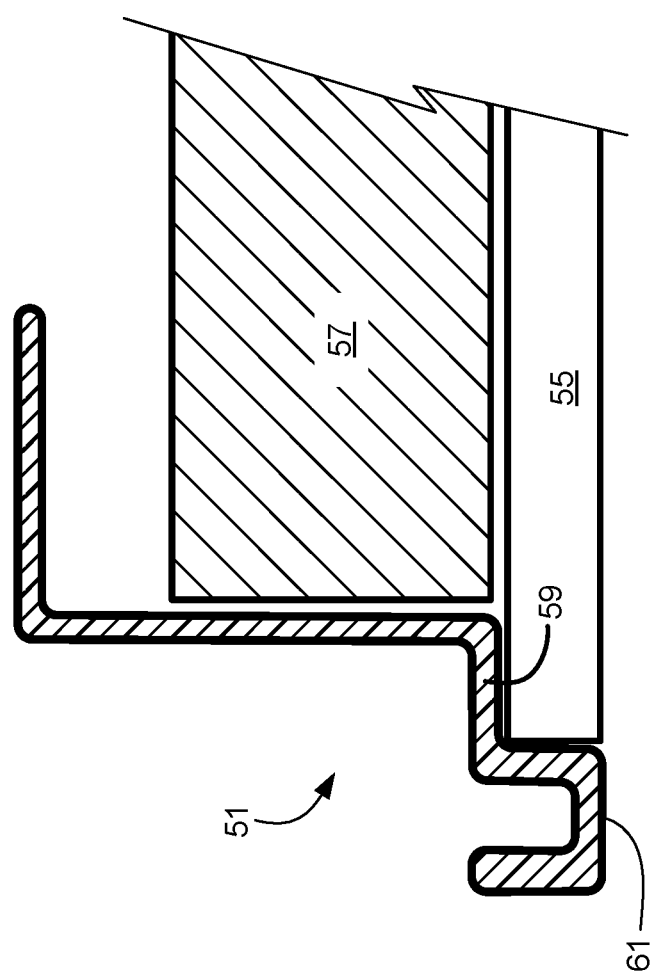
FIG. 3 is a side section view of the return vent assembly of FIG. 1.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE INVENTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The embodiments and method in accordance with the present application overcomes one or more of the above-discussed problems commonly associated with the prior art discussed previously. In particular, the return air seal assembly of the present application includes one or more pieces of a return air seal that are selectively adjusted so as to form a seal around a vent frame assembly. The return air seal includes a flexible body that defines a tubular body having a dome and a base layer. A first channel and a second channel are formed around the tubular sleeve so as to wrap around multiple surfaces of the frame assembly. These and other unique features are discussed below and illustrated in the accompanying drawings.

The embodiments and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe embodiments of the present application and its associated features. With reference now to the Figures, embodiments of the present application are herein described. It should be noted that the articles "a", "an", and "the", as used in this specification, include plural referents unless the content clearly dictates otherwise.

Referring now to FIGS. 4 and 5 in the drawings, a side and front view of the return air seal is illustrated. FIG. 4 provides a side section view of a return air seal 101. As multiple pieces of return air seal 101 are used to wrap around an inner perimeter opening of return vent assembly 51, an assembly is created wherein the individual pieces may be selectively attached or contacted to ensure a proper seal around filter 57. Seal 101 is made from a flexible material to allow it to conform and move so as to fit around the rim of the assembly 51 opening.

Seal 101 is shown in FIG. 4 as a cross section to allow identification of the various parts that will be used to show its function and form in combination with assembly 51. Seal 101 is a flexible body which includes a compression member 103, a first arm 105, and a second arm 107. Member 103 has a base layer 109 and a defined thickness 111 that extends down away from base layer 109. The thickness 111 is a solid or hollowed extension from layer 109 that is used to assist in creating a seal between the rim of assembly 51 and filter 57. As seen in the Figures, the shape shown for thickness 111 is that of a dome wherein a central hollowed passage 113 is formed. The walls of the thickness 113 are configured to compress and flex when the overall compression member 103 is pressed between the rim opening and filter 57. This compression of thickness 111 exerts or creates an outward force exerted away from layer 109 against filter 57.

The shape and form of thickness 111 is not meant to be limiting as there are multiple shapes that may be available to one skilled in the art to form a seal. In this embodiment, a central passage 113 is formed. Such is, however, not required. A key feature of seal 101 is that the compression member 103 is configured to selectively compress when pressed between the vent opening and filter 57. Any number of shapes are possible. In one embodiment it is understood that passage 113 is not hollowed but is in fact filled in with the same or similar material of seal 101.

First arm 105 is a relatively flat member that extends parallel to base layer 109. In fact, arm 105 is gapped a distance away from layer 109 so as to form a first channel 115. First arm 105 is coupled to a first edge 118 of layer 109 at a proximate end. This allows first arm 105 to flex or pivot so as to open channel 115 or vary it within its width. Second arm 107 extends from a distal end 119 of first arm 105 relatively perpendicularly. Ideally this allows second arm 107 to extend down along a side of compression member 103. A gap or second channel 117 is formed between compression member 103 and second arm 107. Channels 115 and 117 are non-planar with each other. Much the same as with first arm 105, second arm 107 may flex or pivot at distal end 119 so as to vary the width of channel 117.

As seen in FIG. 5, a front view of seal 101 is shown. The length of seal 101 may be any desired length. A user may be permitted to trim it to length or it may be sized to fit selected openings of assembly 51. It may be manufactured in rolls or bundles and adapted to use as needed.

Figure 6:
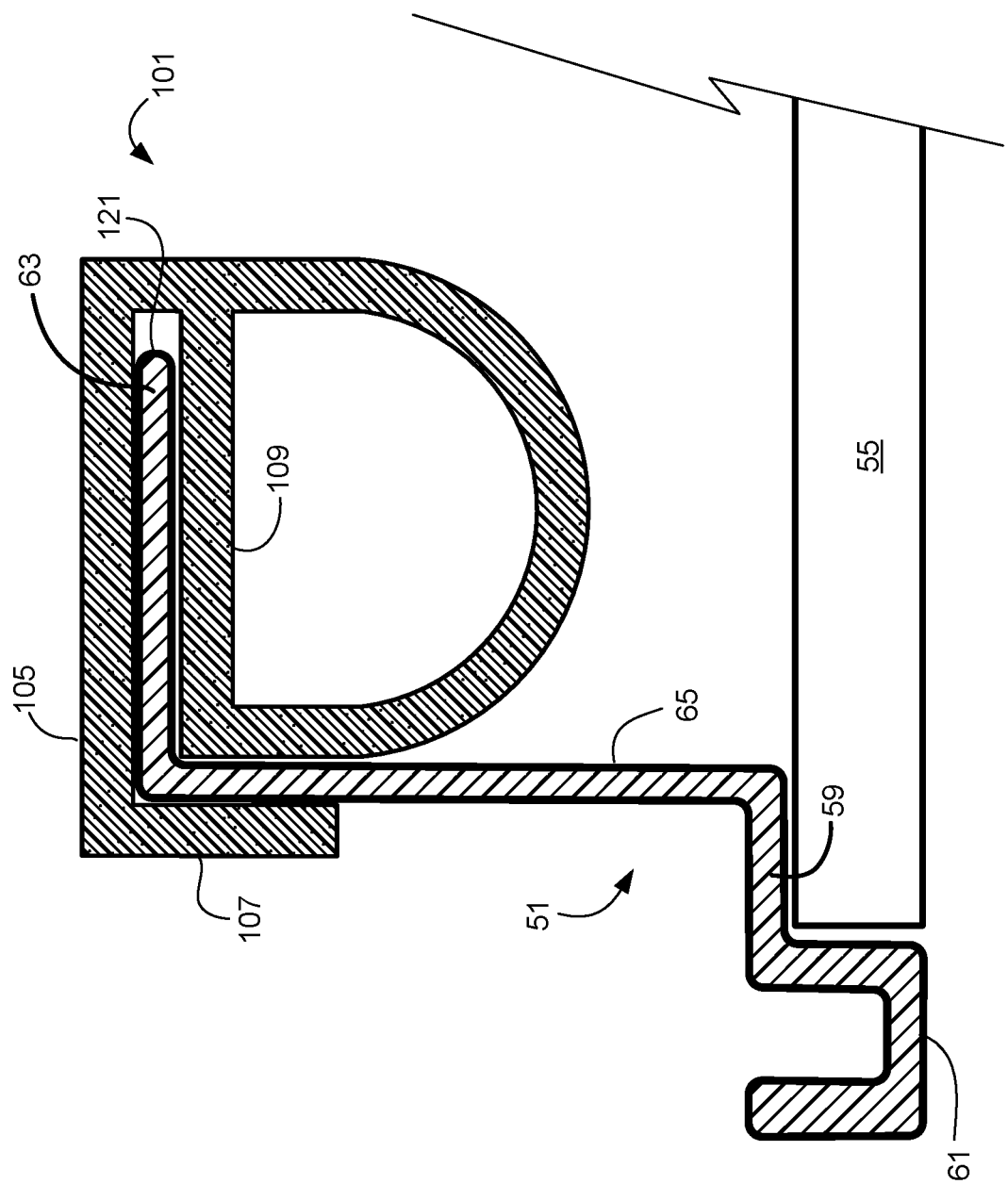
FIG. 6 is a side section view of the return air seal assembly of FIG. 4 in the return vent assembly of FIG. 1.

Referring now also to FIG. 6 in the drawings a sectional view of seal 101 around return vent assembly 51 is illustrated. Vent assembly 51 is typically constructed to have an internal opening defined via an angled filter arm containing a flange 63 which extends inwardly to provide a backing for the support of filter 57. Also included is support member 65 which extends upward from ledge 59 to locate flange 63. When grille 55 is closed, as shown, a distance exists between a lower surface of flange 63 and grille 55. Within this distance, filter 57 is inserted (see later Figures).

Return air seal 101 is configured to wrap over and around flange 63 and extend down along an outer surface of support member 65. A bottom surface of layer 109 is configured to contact the lower surface of flange 63. Flange 63 is inserted within first channel 115. Support member 65 is located within second channel 117. In this manner, seal 101 passes wholly around flange 63, thereby extending over the most inner edge 121 of flange 63 as well as also passing down along the outside surface of support member 65. Second arm 107 is configured to restrict movement of seal 101 from sliding inwardly within the opening of assembly 51 so as to slide off flange 63. Layer 109 and first arm 105 are configured to grip or contact opposing surfaces of flange 63. Any air that may try and pass between seal 101 and support member 65 would be trapped or stopped as first arm 105 is coupled to layer 109 at the first edge 118.

Figure 7:
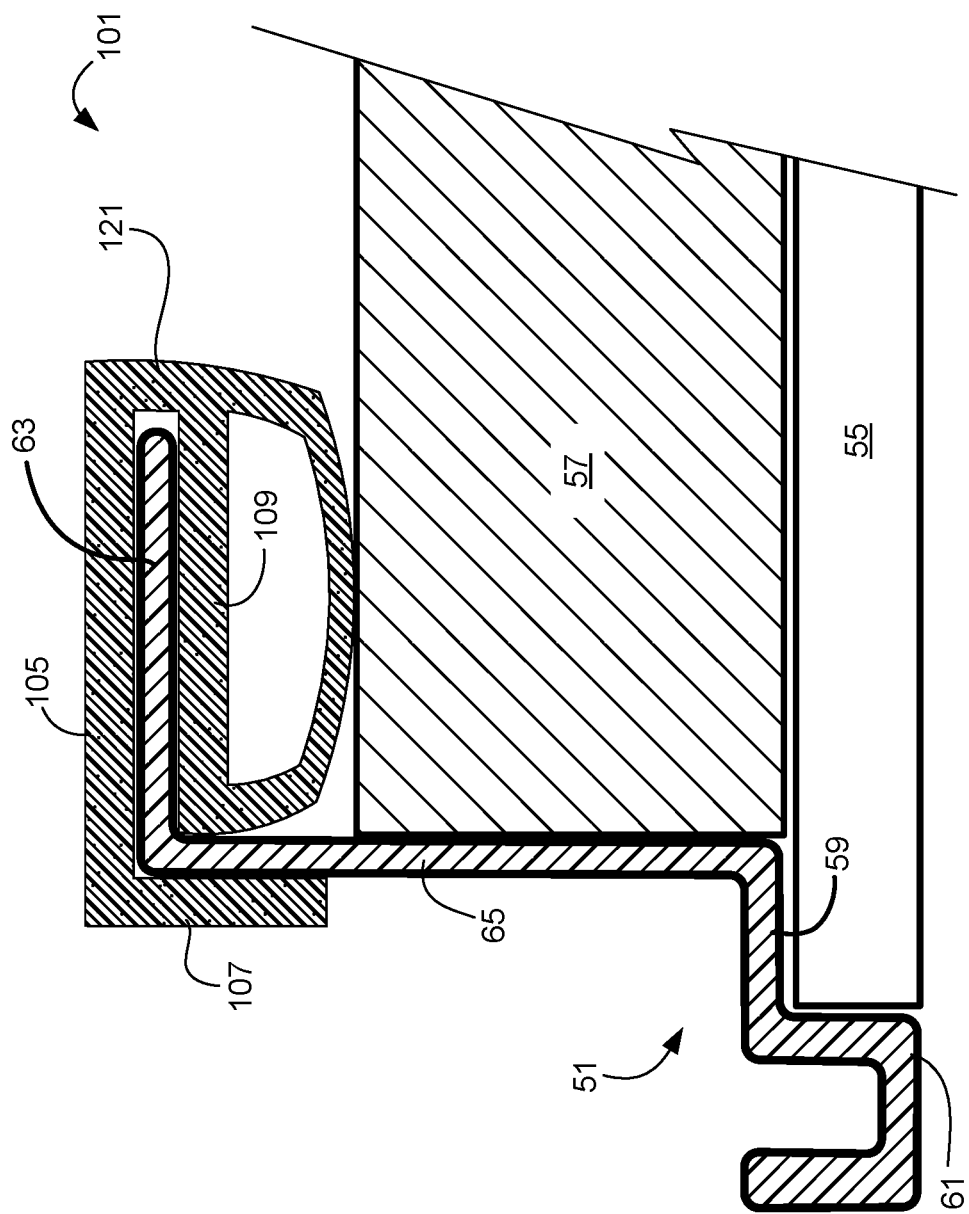
FIG. 7 is a side section view of the return air seal assembly of FIG. 6 with a filter.

Referring now also to FIG. 7 in the drawings, a section view of return air seal 101 is illustrated with assembly 51. In this Figure, filter 57 is shown to help illustrate the compressive effect of seal 101. Filter 57 is located between grille 55 and thickness 111. Thickness 111 is compressed and therefore creates a seal and force against filter 51. Air passing through grille 55 would of necessity pass through the filter elements of filter 57. Seal 101 is configured so as to not be restricted or limited in the exact thickness of compression member 103. It may be adjusted or selected based to fit needs of filter 57 and assembly 51.

In operation, a user is able to obtain return air seal 101. The user may need to trim or adjust the length of seal 101 as needed to fit the configuration or size of assembly 51. Typically this opening is rectangular and therefore 4 independent sides may be used. Conversely, a singular piece may be used that flexes to fit all sides of the opening defined by flange 63 simultaneously so s to avoid gaps in the corners between seals. A user then presses a filter into the opening so as to compress a portion of the thickness 111. The grille 55 is closed to locate the filter.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A return frame assembly, comprising: a return air seal; a return vent assembly having an angled filter arm, the angled filter arm extending inward within a vent opening; wherein the angled filter arm seats within the first channel and a second channel between the second arm and a dome, such that the return air seal wraps around multiple surfaces of the angled filter arm; wherein the return air seal, comprising: a flexible body forming: a compression member having a base layer and a thickness extending out from the base layer; a first arm relatively parallel to the base layer, the first arm gapped from the base layer to form a first channel; and a second arm extending from an end of the first arm along a surface of the thickness; wherein the second arm extends from a distal end of the first arm; wherein the second arm defines a second channel, the second channel being adjacent to the thickness; wherein the first arm is coupled to the base layer at a first edge of the base layer; wherein the second arm is perpendicular to the first arm; wherein compression of the thickness creates a force exerted away from the base layer; and further comprising: a filter located within the vent opening and compressed against the dome to create a seal.

2. The assembly of claim 1, wherein the compression member is configured to compress.

3. The assembly of claim 1, wherein the second arm forms a second channel being non planar with the first channel.

4. The assembly of claim 1, wherein the compression member includes the dome, the dome being hollow.

5. The assembly of claim 1, wherein the second channel is non planar with the first channel.

6. A method of sealing a filter within a return vent assembly, comprising: locating a return air seal according to claim 1; flaring open the first channel and the second channel so as to widen each channel; sliding the flexible body over an angled filter arm of the return vent assembly; and locating the first arm on a surface of the angled filter arm and locating the second arm on a second surface of the angled filter arm.

7. The method of claim 6, further comprising: trimming the return air seal to length.

8. The method of claim 6, further comprising: compressing the thickness with the filter to create a seal.

9. The method of claim 6, further comprising: closing a grille in the return vent assembly to hold the filter in place.

* * * * *